Sept. 26, 1967  H. C. ANDERSON  3,344,411
SPIN RESONANT RECORDING PROCESS
Filed Sept. 17, 1964

INVENTOR
HAROLD C. ANDERSON

BY Alfred B. Levine
ATTORNEY

United States Patent Office 3,344,411
Patented Sept. 26, 1967

3,344,411
SPIN RESONANT RECORDING PROCESS
Harold C. Anderson, New Brighton, Minn., assignor to Litton Systems, Inc., Silver Spring, Md.
Filed Sept. 17, 1964, Ser. No. 397,201
6 Claims. (Cl. 340—173)

ABSTRACT OF THE DISCLOSURE

A spin resonant recording process for recording high frequency radio signals involving the steps of bringing together a moving mass of spin resonant material and a separate moving heat sensitive recording member into a recording zone and at the recording zone subjecting the members to both a tuning magnetic field to bring about a resonance condition in the mass at the frequency of the radio signal and to the radio frequency signal to be recorded.

---

Figure 1:
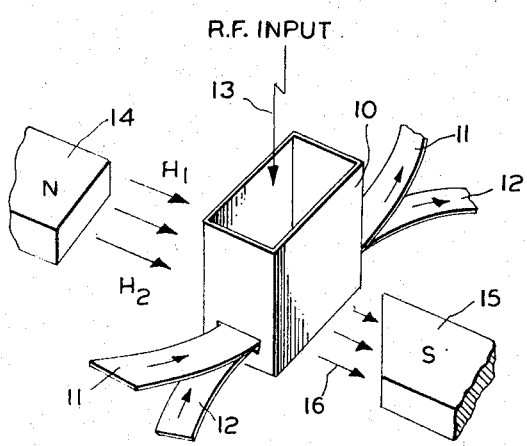

This invention relates to improvements in the recording of radio frequency signals by spin resonance methods, and more particularly is directed to such methods in which the recording is performed by a transfer of images from a moving radio frequency responsive transducing member to a moving heat responsive recording member.

In a copending application of Kenneth Peltzer, Ser. No. 102,429, now Patent No. 3,152,321, and in earlier Patents Nos. 3,134,093, 3,134,094, 3,137,003 and 3,137,841, all of the same assignee, there is disclosed methods of transducing and recording radio signals by spin resonance technology wherein the radio signals are initially converted into the form of heat patterns, and the heat patterns being produced are recorded or displayed by the use of heat responsive mediums. In these transducers, the conversion of the radio signals into heat is performed by applying the signals to a stationary frequency sensitized spin resonant mass and the heat images being produced are transferred to a separate heat responsive recording member, such as a web or tape.

Alternatively, in other copending applications of the same assignee, such as S.N. 73,695, now Patent No. 3,243,784 of Harold C. Anderson, et al., the spin resonant material may be mixed or otherwise intimately combined with a heat responsive indicating mechanism so that both the transducing and recording of the radio signal occur together on the same recording tape or record member.

According to the present invention, there is provided a different process in which the spin resonant material and the heat responsive recording material are each supported on different moving members and the two members are brought together or associated in heat transferring relationship within a common recording zone. In this manner, the transducing of the radio signals into heat is performed by a first moving transducer member, and the recording of the heat patterns being produced is performed by transfer of the heat images from the first moving member to a second moving recording member. In the present invention, therefore, unlike that of the above transducer inventions, different portions of spin resonant material are successively exposed to the radio signal instead of continuously exposing the same portion of spin resonant material to the radio signal.

It is accordingly a principal object of the invention to provide a spin resonant process for recording or indicating radio waves on a moving heat responsive medium from a moving transducer medium.

A further object is to provide such a process employing a reuseable spin resonant transducing member.

A still further object is to provide such a process wherein the transducing of the radio wave and the recording of the transduced wave are performed on separate moving members.

Figure 2:
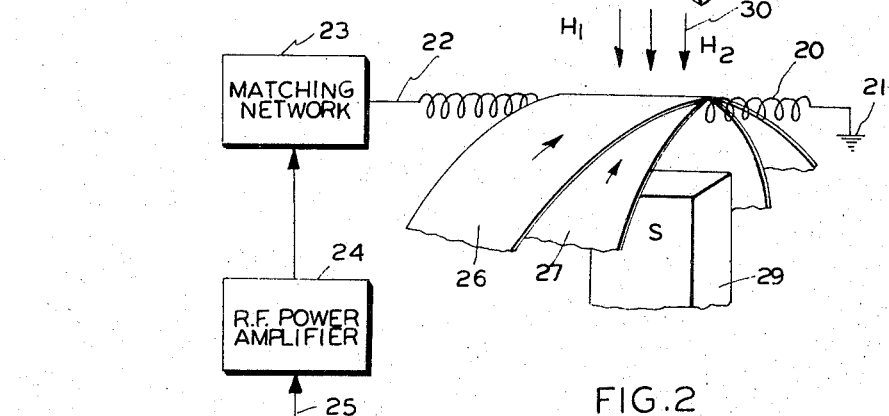
Figure 3:
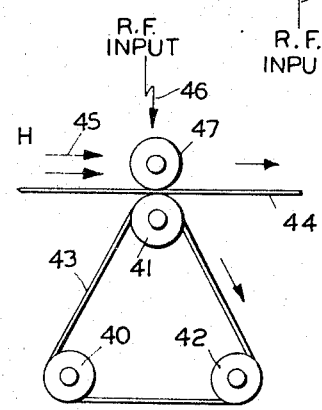

Other objects and many additional advantages will be more readily understood by those skilled in the art after a detailed consideration of the following specification taken with the accompanying drawing wherein:

FIG. 1 is a perspective view illustrating the application of the present invention using a high frequency cavity type apparatus, FIG. 2 is a diagrammatic view illustrating the application of the invention using a slow wave apparatus, and FIG. 3 is a diagrammatic illustration showing the use of an endless web for carrying the moving transducing medium.

Referring to the drawings, there is shown in FIG. 1 one manner of practicing the process of the present invention employing a cavity or waveguide 10 as part of the transducer. As shown, a radio frequency signal 13 to be transduced is directed into the upper opening of the waveguide 10, formed of electrically conducting material such as aluminum, which provides a recording zone adjacent to its base, and a pair of tuning magnets 14 and 15 are disposed on opposite sides of the waveguide 10 near its base to direct a magnetic turning field 16 through the walls of the cavity 10 into the recording zone. As shown, the orientation of the tuning magnetic field 16 is provided transversely to the radio frequency magnetic field being produced by the incoming signal 13 to be recorded.

At the base of the waveguide 10, there is provided suitable openings 17 in opposite side walls for admitting and passing a pair of moving webs 11 and 12 through the recording zone provided in this portion of the cavity. One of the traveling webs 11 contains a spin resonant material as a coating or embedded therein, and the other web 12 contains a heat sensitive indicator material, such a phototropic dye, as a coating or embedded therein.

As is disclosed in further detail in the above mentioned Patent No. 3,137,841, the recording zone is provided near the end conducting wall of the weveguide so as to provide at this region a minimized electric field component of the radio frequency signal 13 and a maximized magnetic field component. The minimized electric field reduces the possibility of spurious radio frequency heating of the webs 11 and 12. However, as is discussed in this patent and in the others mentioned above, other locations in the cavity may be selected for the same purpose.

The magnetic field component, on the other hand, is applied to the transducing tape 11 with a maximum intensity at the recording zone whereby the spin resonant material on the tape 11 receives a maximum exposure to the radio signal. Within the recording zone, the transducing tape 11 is concurrently tuned by the external magnets 14 and 15 into resonance or energy absorptive relationship with the radio signal 13 and accordingly the frequencies of the radio signal to which the transducing tape 11 is tuned are absorbed by the tape 11, and this absorbed energy is reradiated from the tape 11 in the form of heat patterns.

The recording tape 12 being fed into the same opening 17 of the cavity 10 is brought into contact or heat transferring relationship with the transducing tape 11 whereby the heat patterns being produced in the transducing tape 11 are transferred to the moving recording tape 12 to effect recordings of the heat patterns.

For providing either a continuous or continual record of the time variations of the radio signal 13, the two tapes 11 and 12 may be continuously or intermittently fed through the recording zone of the cavity 10 to successively expose different positions along the length of the transducing tape 11 and thereby successively convert variations of the signal 13 with time into correspondingly changing heat patterns. Each of these succeeding heat patterns is applied to a different position along the length of the moving recordnig tape 12 to record the sequence of heat images along the length of the recording tape 12.

In the present invention, as in the abovementioned transducer patents, the spin resonant material carried by the transducer tape 11 is not permanently changed by its exposure to the radio signal 13, but instead each portion absorbs radio frequency energy from the signal and reradiates the absorbed energy in the form of a decaying heat pattern that after a period of time decays to its initial condition and may be reused. Thus, as shown in FIG. 3, the transducer tape 11 may be provided in the form of an endless web 43 that is supported for continuous movement by the drive rollers and idler rollers 40, 41, and 42, as shown to be repeatedly circulated through the recording zone of the cavity 10 of FIG. 1 so as to successively transduce the radio images in the manner described.

To transfer the heat images from the transducing tape 43 to the recording tape 44 in FIG. 3, the endless tape 43 and record tape 44 are brought together between a pair of pressure engaging rollers 41 and 47 that are adapted to be located within the cavity 10 at the recording zone; and in this manner, a continuous heat transferring contact between the two tapes may be obtained to insure the transfer and recording of the images.

FIG. 2 illustrates the application of the invention using a different form of transducing mechanism of the slow wave type. In this embodiment, the separate transducing tape 26 and recording tape 27 are exposed to the magnetic component of the radio signal 25 to be recorded by means of a slow wave helix 20, and a pair of magnets 28 and 29 are positioned at the recording zone to tune the transducing tape 26 to the frequencies of the radio signal in the same manner as described above. The mode of operation of this embodiment is generally the same as that of the cavity type transducer of FIG. 1, in that the concurrent application of the radio frequency magnetic field and the magnetic tuning field 30 result in corresponding heat images being successively produced in the moving transducer tape 26. The transfer and recording of these images is performed at the recording zone where the recording tape 27 is brought together in heat transferring relationship with the transducing tape 26.

As is more fully disclosed in copending application Ser. No. 101,741, this slow wave type transducing mechanism provides the advantage over the cavity type of FIG. 1 of permitting the transducing of a wider bandwidth of radio frequencies than can be efficiently passed by the cavity type transducer, and this is desired for many applications.

Returning to FIG. 2, for a more detailed description of the slow wave structure, the incoming radio signal 25 to be recorded is initially amplified by radio frequency amplifier 24, and the amplified output is applied to the matching network 23 which performs the function of impedance matching the amplified radio signal to the helix 20 or to the other slow wave structure that may be employed. A standing wave or traveling wave of the radio frequency field is produced about the helix 20 with a maximum intensity due to the matching network 23, and this standing wave is applied along the width of the transducer tape 26 at the recording zone where the tape 26 is brought into energy transfer relationship with the helix 20. As in the cavity type embodiment of FIG. 1, the recording tape 27 is also conveyed to the same recording zone and suitably brought into heat transferring relationship with the transducer tape 26 to receive and record the succession of heat images being produced in the tape 26.

As is disclosed in the above mentioned applications, it is often desired to separate the different frequency components of the radio signal and to separately record each different component at a different position across the tape to obtain the recording in the form of frequency spectrum images. This is performed by using a nonuniform tuning magnet configuration, such as the tapered pole face of magnet 15 in FIG. 1 or that of the magnet 28 in FIG. 2, which applies a different intensity magnetic tuning field to different positions across the transducing tape in the recording zone. The spin resonant materials used in the transducer tapes are frequency sensitive materials that are selectively tunable to different radio frequencies in proportion to the amplitude of the tuning magnetic field being applied thereto, whereby the use of the nonuniform magnetic fields for spectrally tuning the tape 26 enables different positions across the tape 26 to selectively absorb different frequency components of the incoming wave, and thereby to provide frequency spectrum heat images of the radio signal. This manner of frequency spectrum transducing and recording is discussed in much greater detail in the above-mentioned applications and patents, and need not be repeated in any greater detail in the present application.

As is now believed evident to those skilled in the art, the process of the present invention may be practiced with the specific transducer mechanism of FIG. 1 or that of FIG. 2, or with any of the other type transducers such as are disclosed in the above-mentioned applications and patents. For example, since the spin resonant materials employed are sensitive to either magnetic fields produced about a current carrying conductor or to the magnetic component of radiant electromagnetic fields, the radio signal to be recorded may be applied to the moving transducer tape 11 by the use of any energized current carrying conductor or by any radiant electromagnetic beam producing mechanism, such as a radio antenna.

A relatively large number of different spin resonant materials may be employed in the practice of the present invention as discussed in the above-mentioned patents and patent applications, as well as in copending application Ser. No. 59,342, and Ser. No. 306,061. One of the most suitable class of materials in the stable free radicals; and the free radical diphenyl picryl hydrazyl has been found particularly suitable. This material is readily obtainable on the open commercial market in the form of a fine particle powder and is easily applied as a coating on a suitable tape base of material as Mylar. A large number of different heat sensitive recording materials may be employed for the recording member, many of which are well known and used in photocopy recording processes such as "Thermofax." "Thermofax" and other such materials are also available on the open market in sheet or record form as might be desired. Additional heat sensitive recording materials are also discussed in the above-mentioned applications and patents.

Although but preferred embodiments of the present invention have been illustrated and described, it is believed evident to those skilled in the art that many changes may be made without departing from the spirit and scope of this invention. Accordingly, this invention is to be considered as being limited only by the following claims appended hereto.

What is claimed is:

1. A process for recording radio frequency signals comprising: directing the signals to a radio frequency cavity, applying a tuning magnetic field to the cavity to provide a recording zone for receiving both the radio signal and the magnetic tuning field, introducing a pair of moving members into the cavity at the recording zone to interengage therein in heat transferring relationship, one of said moving members containing a spin resonant material that responds to the radio signal and tuning field to absorb energy from the signal and reradiate heat, and the second member containing a heat responsive indicator to record the heat being produced in the first member.

2. A process for recording radio frequency signals comprising: directing the radio signals to energize a slow wave structure for producing a corresponding radio frequency magnetic field component over a given recording zone region, applying a tuning magnetic field to the recording zone region about the slow wave structure, conveying a moving transducer member containing spin resonant material through the recording zone and in energy absorptive relationship with the radio frequency magnetic field thereby to produce corresponding heat patterns, and conveying a separate moving record member containing a heat responsive indicator into heat transferring relationship with the transducer member thereby to receive and record the heat patterns being produced in the transducer member.

3. A process for recording radio signals comprising: subjecting a moving transducer member containing a spin resonant material to the radio signal and to a tuning magnetic field thereby to selectively produce heat patterns in the record moving transducer, and conveying a separate heat responsive indicator successively into heat transfer relationship with the moving spin resonant material thereby to transfer and record the heat patterns.

4. A process for recording radio frequency signals by spin resonance comprising: applying the radio signals at a recording zone, illuminating the recording zone by a magnetic tuning field, conveying a series of spin resonant masses sequentially through the recording zone each to receive both the radio signal and the magnetic tuning field at a different time and thereby selectively absorb energy from the radio signal and reradiate the absorbed energy in the form of a heat pattern, and successively conveying a series of separate heat responsive indicators through the recording zone in heat transfer relationship with the spin resonant masses thereby to receive and successively record the heat patterns being produced.

5. A method of recording radio frequency signals comprising: passing a series of portions of spin resonant material in succession through a recording zone, passing a series of portions of heat responsive recording material through said zone separately from the spin resonant material but in heat transferring relationship with the spin resonant material within the recording zone, applying the radio frequency signal to be recorded at the recording zone and in energy transfer relation with the spin resonant material therein, and applying a tuning magnetic field to the recording zone to tune the spin resonant material into energy absorptive relationship with the spin resonant material therein.

6. A recording process for radio signals comprising: recirculating a first member carrying spin resonant material through a recording zone, conveying a second member carrying a heat responsive material through the zone and in heat transferring relationship with the first member, energizing the recording zone by a radio signal to be recorded, and tuning the spin resonant material to absorb energy from the radio signal by applying a magnetic field to the recording zone.

References Cited

UNITED STATES PATENTS 2,890,288   6/1959   Newman _____ 179—100.2
3,152,321   10/1964  Peltzer _____ 340—173

TERRELL W. FEARS, *Primary Examiner.*